(12) United States Patent
Adenau et al.

(10) Patent No.: US 8,514,192 B2
(45) Date of Patent: Aug. 20, 2013

(54) METHOD FOR OPERATING A LIGHTING CONTROL CONSOLE

(75) Inventors: Michael Adenau, Würzburg (DE); Hartmut Cordes, Bremen (DE)

(73) Assignee: MA Lighting Technology GmbH, Waldbutielbrunn (DE)

( * ) Notice: Subject to any disclaimer, the term of this patent is extended or adjusted under 35 U.S.C. 154(b) by 311 days.

(21) Appl. No.: 12/984,199

(22) Filed: Jan. 4, 2011

(65) Prior Publication Data
US 2012/0169616 A1 Jul. 5, 2012

(51) Int. Cl.
*G06F 3/041* (2006.01)

(52) U.S. Cl.
USPC .............................................. 345/173; 362/85

(58) Field of Classification Search
USPC ................. 345/418, 173–184; 700/103–173; 362/85
See application file for complete search history.

(56) References Cited

U.S. PATENT DOCUMENTS

| | | | | |
|---|---|---|---|---|
| 2004/0207605 A1* | 10/2004 | Mackey et al. | ............... | 345/173 |
| 2005/0012474 A1* | 1/2005 | Belliveau | ...................... | 315/294 |
| 2007/0103447 A1* | 5/2007 | Varian et al. | .................. | 345/173 |
| 2008/0012849 A1* | 1/2008 | Snyder et al. | ................. | 345/418 |
| 2008/0192020 A1* | 8/2008 | Kang et al. | .................... | 345/173 |
| 2008/0192026 A1* | 8/2008 | Mackey et al. | ............... | 345/174 |
| 2008/0290816 A1* | 11/2008 | Chen et al. | .................... | 315/294 |
| 2009/0153495 A1* | 6/2009 | Chen et al. | .................... | 345/173 |
| 2009/0190327 A1* | 7/2009 | Adenau | ........................... | 362/85 |
| 2009/0256814 A1* | 10/2009 | Chung et al. | .................. | 345/173 |
| 2009/0327977 A1* | 12/2009 | Bachfischer et al. | ......... | 715/863 |
| 2010/0073363 A1* | 3/2010 | Densham et al. | ............. | 345/419 |
| 2010/0194705 A1* | 8/2010 | Kim et al. | ...................... | 345/173 |
| 2010/0321315 A1* | 12/2010 | Oda et al. | ....................... | 345/173 |
| 2011/0029185 A1* | 2/2011 | Aoki et al. | ...................... | 701/29 |
| 2012/0019456 A1* | 1/2012 | Choi et al. | ..................... | 345/173 |

* cited by examiner

*Primary Examiner* — Amare Mengistu
*Assistant Examiner* — Vinh Lam
(74) *Attorney, Agent, or Firm* — Quarles & Brady LLP

(57) ABSTRACT

A method for operating a lighting control console (01) for controlling a lighting system, wherein digital adjusting commands are generated in the lighting control console (01), which can be transferred to the lighting devices of the lighting system via data connections, and wherein the lighting control console (01) comprises at least one digital processor and at least one digital memory for generating, managing and storing the adjusting commands, and wherein the lighting control console (01) comprises at least one display unit (07), and wherein graphical elements can be graphically depicted to the user on the display device (07), and wherein the display device (07) exhibits a touch-sensitive sensor surface (10), and wherein touching of the touch-sensitive sensor surface (10) at the display device (07) in the region of a contact surface (14) permits the selection of an operator input assigned to said contact surface (14),
comprising the following method steps of:
a) detecting the touching of the touch-sensitive sensor surface (10) in the region of a contact surface (14a, 14b) in which the sensor surface (10) is covered by a body part of the operator;
b) measuring the dimension of the contact surface (14a, 14b);
c) generating an adjusting command for controlling the lighting system as a function of the measured dimension of the contact surface (14a, 14b).

13 Claims, 4 Drawing Sheets

METHOD FOR OPERATING A LIGHTING CONTROL CONSOLE

CROSS REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The present invention relates to a method for operating a lighting control console which in turn is provided for controlling a lighting system, wherein digital adjusting commands are generated in the lighting control console, which can be transferred to the lighting devices of the lighting system via data connections. The lighting control console includes at least one digital processor and at least one digital memory for generating, managing and storing the adjusting commands, and at least one display device. Graphical elements can be graphically depicted to the user on the display device, and wherein the display device exhibits a touch-sensitive sensor surface. Touching the touch-sensitive sensor surface at the display device in the region of a contact surface permits the selection of an operator input assigned to said contact surface.

BACKGROUND OF THE INVENTION

Generic lighting control consoles serve the purpose of controlling lighting systems, such as are used in theaters or on concert stages. Routinely, these lighting systems comprise a plurality of lighting devices, for example stage spotlights, wherein the lighting devices on their part in many cases can also be changed between a plurality of lighting states, for example different colors. These different lighting states are stored and controlled in the lighting program of the lighting control console by means of programmed parameters. In this context, conventional lighting systems can comprise up to several thousands of lighting devices. To be able to control such complex lighting systems, generic lighting control consoles are equipped with a digital processor, which allows for digital data and signal processing. To store the program data, provision is furthermore made for a digital memory, which makes it possible in particular to archive lighting programs.

To program the lighting program or to control the lighting program during its application flow, the operator must input operating commands. These may, for example, consist in the selection of a specific lighting device or the setting of a specific lighting parameter. To input these operating commands, mechanical operating elements, for example pushbuttons, rotary controls or slide controls, are available at the known lighting control consoles. Here, the operating commands assigned to the individual operating elements can be changed by means of suitable menu changeovers so as to be able to program and control complex lighting programs.

From the field of computer technology, display devices exhibiting a touch-sensitive sensor surface are also known. Such touch screens simultaneously provide the functionality of a user input interface and an output interface. By touching the touch-sensitive sensor surface on the display device the user is able to select specific operating commands.

The known lighting control consoles exhibiting display devices having a touch-sensitive sensor surface are afflicted with the drawback that the intuitive input of operating commands is strongly limited. In particular, inputs in which the input falls within a specific parameter setting range cannot be changed intuitively.

SUMMARY OF THE INVENTION

Based on this state of the art, it is thus the object of the present invention to propose a novel method for operating a lighting control console, which makes it possible to realize the intuitive input of operating commands. This object is achieved by a method including the steps of a) detecting the touching of a touch-sensitive sensor surface in a region of a contact surface in which the sensor surface is covered by a body part of the operator; b) measuring the dimension of the contact surface; and c) generating an adjusting command for controlling the lighting system as a function of the measured dimension of the contact surface.

Advantageous embodiments of the invention are the subject-matter of the subclaims.

The inventive method takes advantage of the aspect that body parts of the user, in particular the fingertips, are elastically deformable so that the shape of the body part changes as a function of the respectively applied pressure. Thus, the area of the touch-sensitive sensor surface which is covered by the body part, in particular the fingertip, is smaller when the user taps on the sensor surface only slightly in contrast to the application of a high pressure on the sensor surface by the user. In this regard, the area of the sensor surface covered by the body part of the user respectively correlates with the contact pressure applied by the user. This contact pressure, however, serves as a good measure for the intuitive change of input parameters.

The inventive method takes advantage of this aspect by measuring the dimension of the contact surface subsequent to the detection of a touching of the touch-sensitive sensor surface in the region of a contact surface. The dimension of the contact surface covered by the body part is then used in the generation of ar adjusting command to change a parameter of the adjusting command. As a result, the user is provided with the option of changing adjusting commands by changing the contact pressure without for this purpose necessitating a pressure-sensitive sensor in the sensor surface. Instead, the contact pressure is indirectly derived from the dimension of the contact surface on the sensor surface which is covered by the body part of the operator and an adjusting command is then generated on the basis of this measurand.

The manner in which the dimension of the contact surface covered by the body part is measured is basically arbitrary. According to a preferred method alternative, for this purpose a plurality of sensor points are provided in the touch-sensitive sensor surface. These sensor points for instance may be the intersection points of measuring wires which extend in an essentially rectangular lattice pattern in the sensor surface. If the sensor surface is then covered by a body part of the user, the number of sensor points which are covered by the body part of the operator can be evaluated to measure the dimension of the contact surface. On the basis of this measured number of covered sensor points, the contact surface covered by the body part can then be derived subject to a slight tolerance.

Moreover, it is particularly advantageous if at least one operating element is simultaneously displayed at the display device during the execution of the inventive method. This operating element is then respectively assigned an operator input.

In the execution of the inventive method, the operating element preferably may be a pushbutton, since pushbuttons are particularly suitable for inputting operating commands with varying input pressure. This also corresponds to the intuitive expectation of the user during use of a pushbutton, which may exhibit two or more states. The inventive evaluation of the dimension of the contact surface covered by the body part of the operator allows for drawing conclusions as to the pressure applied by the user to press the pushbutton displayed on the screen. As a function of the contact pressure derived in this manner, an operator input, for the control of which the pushbutton is provided, can then be changed.

In addition, it is particularly advantageous if a functional element of the lighting system, in particular a lighting device, is selected in the execution of the inventive method by touching the operating element, and a parameter of the selected functional element is set as a function of the measured dimension of the contact surface subsequent to the measurement of the dimension of the contact surface on the operating element. This method alternative for instance may be characterized in that a pushbutton, which is displayed on the display device, is assigned to a stage spotlight, and said stage spotlight is selected by touching the displayed pushbutton. Subsequently, for instance the lighting intensity of the stage spotlight can be changed by evaluation of the contact surface covered on the pushbutton. As a result, the user is provided with a highly intuitive user option firstly to select a stage spotlight and secondly to change the lighting intensity thereof.

Alternatively to the change of the lighting intensity of a lighting device, the zoom factor of a lighting device and/or the freeze factor of a lighting device and/or the pan-setting and/or the tilt-setting of a lighting device can be changed as a function of the measured dimension of the contact surface.

Moreover, it is also possible to change the speed of motion of a drive device for adjusting a lighting device, in particular a spotlight, as a function of the measured dimension of the contact surface. A high contact pressure applied onto a correspondingly large covered contact surface for instance leads to a high speed of motion, whereas a low contact pressure applied onto a small covered contact surface leads to a low speed of motion.

Since the correlation between the contact pressure and the contact surface covered by the body part of the user individually depends on the elasticity of the body parts of the user, a calibration of the lighting control console prior to the use of the inventive method is regularly necessary. This calibration for instance can be performed by setting the parameter of the selected functional element as a function of the measured dimension of the contact surface within a predefined value range, wherein the lighting control console is calibrated by the recording of at least the dimension of a contact surface in the form of a measurand during at least one calibration step, and by then assigning said measurand a value from the value range of the parameter.

If several such calibration steps are executed, the measurands and the respectively assigned parameters can each be stored in a lookup table.

Alternatively hereto, it is also possible to execute several calibration steps, wherein the measurands are combined by interpolation of the function curve. This function curve is then stored and is used at a later time for determining the functional correlation between reference value and measurand.

BRIEF DESCRIPTION OF THE DRAWINGS

Different aspects of the invention are schematically illustrated in the drawings and will be described in the following by way of example.

In the drawings.

DETAILED DESCRIPTION OF THE EXAMPLE EMBODIMENTS

Figure 1:
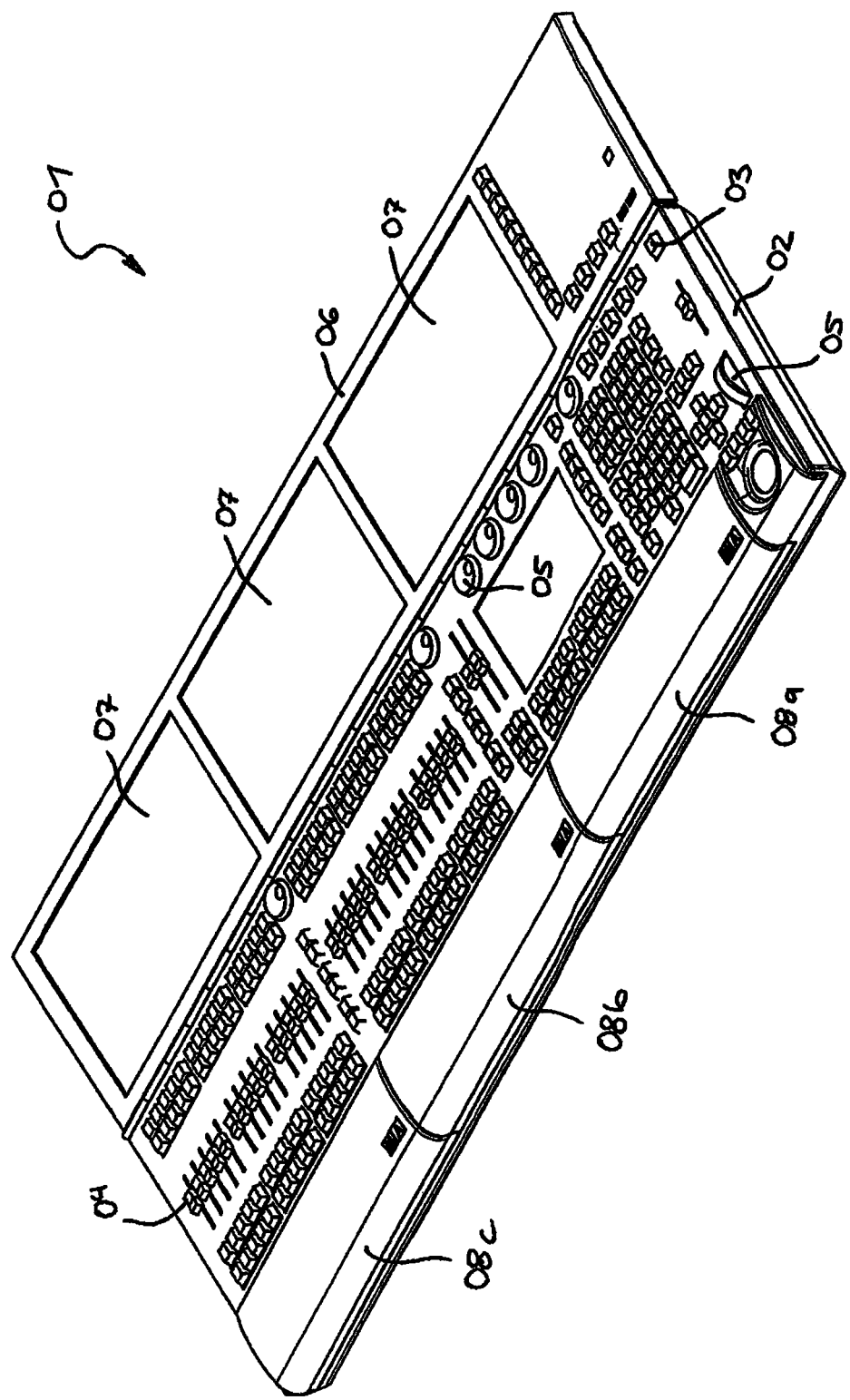
FIG. 1 shows a lighting control console having several display devices, which are each assigned a touch-sensitive sensor surface, in a perspective top view.

FIG. 1 shows a lighting control console for controlling a complex lighting system. In the housing 02, several digital processors and digital memories are here disposed for generating, processing and storing digital adjusting commands. A plurality of operating elements, namely pushbuttons 03, slide controls 04 and rotary controls 05, are located at the top side of the housing 02. Furthermore, the lighting control console 01 is equipped with a pivotable support 06 at which provision is made for three touch-sensitive display devices 07. The touch-sensitive display devices 07 allow for the detection of a touching of the sensor surface in contact surfaces which are covered by the fingertips of the user.

Figure 2:
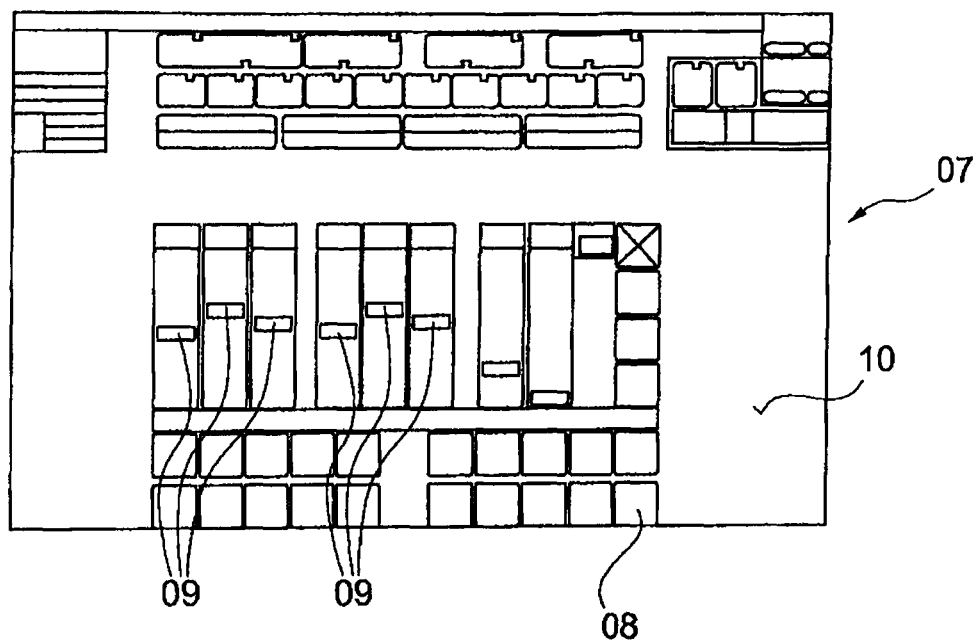
FIG. 2 shows a display device having a touch-sensitive sensor surface of the lighting control console according to FIG. 1 during the display of several operating elements, namely slide controls and pushbuttons.

FIG. 2 shows a display device 07 of the lighting control console 01 during the display of a first operation scenario with several symbolically represented pushbuttons 08 and several symbolically represented slide controls 09 which can each be linearly shifted along a predetermined adjustment path for parameterizing specific functional elements. During use of the display device 07 with its touch-sensitive sensor surface 10, a touching by the finger of the user can then be detected, wherein a touching of the sensor surface 10 for instance in the region of a pushbutton 08 permits the selection of a specific spotlight.

Figure 3:
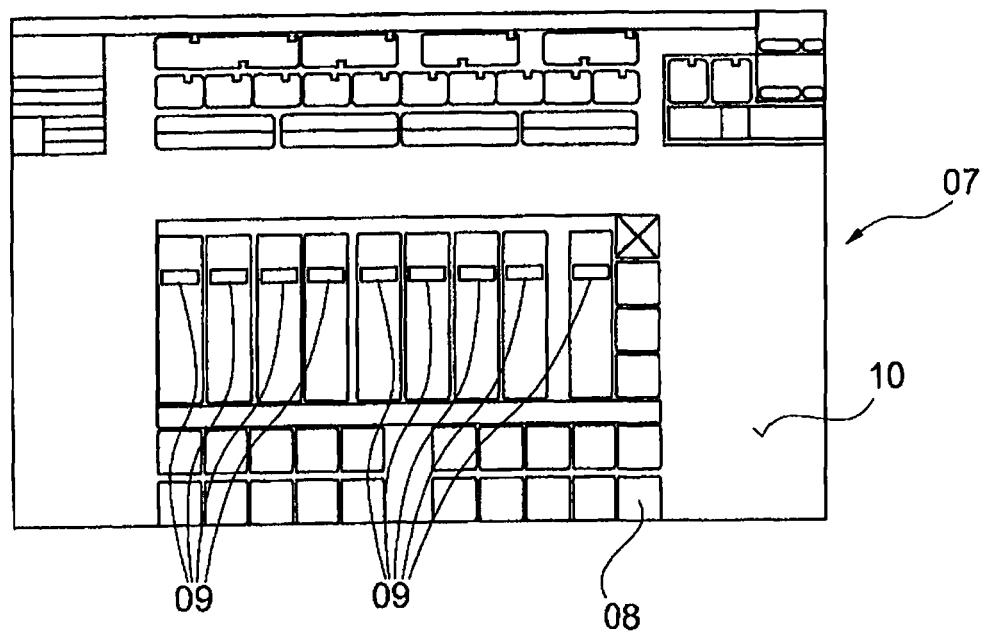
FIG. 3 shows the display device according to FIG. 2 upon actuation of some operating elements.

FIG. 3 shows the display device 07 during the display of a second operation scenario, in which for instance the slide controls 09 have all been set so as to be on the same level.

Figure 4:
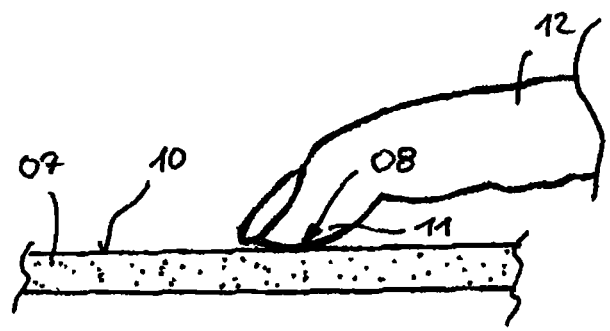
FIG. 4 shows the display device according to FIG. 3 being touched by a finger of the user who applies a small pressure onto the pushbutton.

FIG. 4 shows the touch-sensitive display device 07 upon touching of the sensor surface 10 in the region of a pushbutton 08 displayed at the display device 07 during the application of a low pressure onto the pushbutton. It is apparent that the fingertip 11 of the finger 12 is only very slightly elastically deformed due to the low pressure applied onto the pushbutton on the sensor surface 10.

Figure 5:
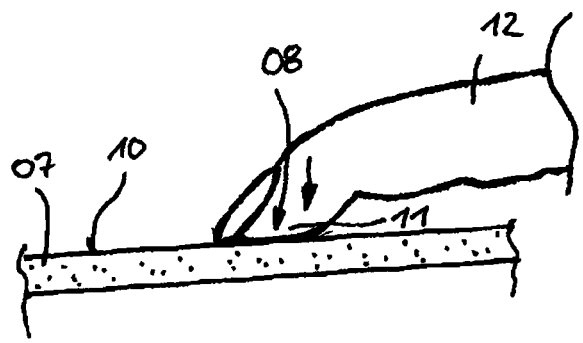
FIG. 5 shows the display device according to FIG. 4 being touched by a finger of the user who applies a high pressure onto the pushbutton.

FIG. 5 shows the display device 07 upon touching of the sensor surface 10 in the region of the pushbutton 08 during the application of an increased pressure onto the pushbutton. The fingertip 11 is strongly pressed against the sensor surface 10 due to the increased pressure applied onto the pushbutton so that the fingertip is elastically deformed.

Figure 6:
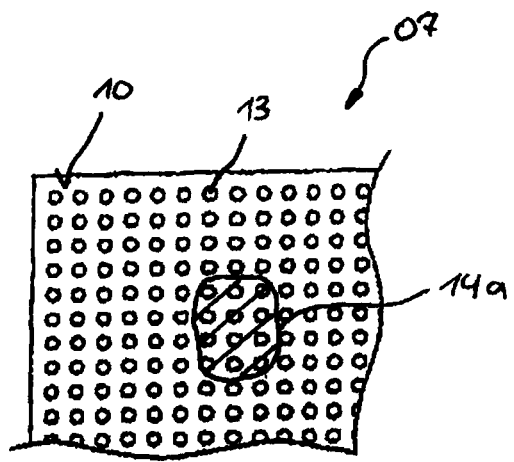
FIG. 6 shows the display device according to FIG. 4 showing the sensor surface being covered by the finger of the user in a top view.
Figure 7:
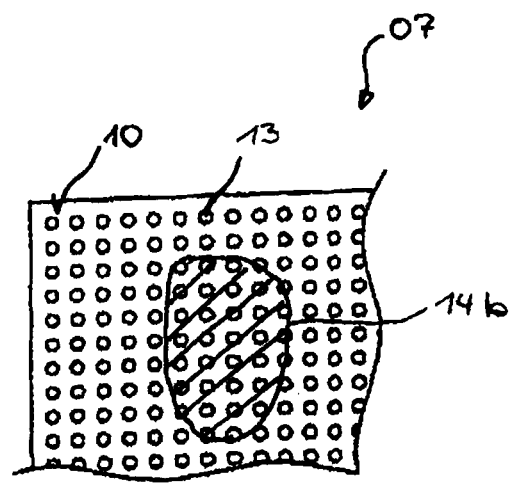
FIG. 7 shows the display device according to FIG. 5 showing the sensor surface being covered by the finger of the user in a top view.

FIGS. 6 and 7 each show the display device 07 having the touch-sensitive sensor surface 10 in a top view. The touch-sensitive sensor surface 10 is formed by a plurality of sensor points 13. In this regard, in each sensor point 13 it can be detected whether or not the respective sensor point 13 is covered by the fingertip 11.

FIG. 6 shows the situation upon touching while applying a low pressure onto the pushbutton, as is shown in FIG. 4. The sensor surface 10 is covered only in a relatively small contact surface 14a which is illustrated using dashed lines. Said contact surface 14a here corresponds to the covering of a total of twelve sensor points 13 so that during evaluation of the sensor surface 10, twelve sensor points 13 would be identified as being covered by the fingertip 11 of the operator. A parameter of a lighting device, for instance the lighting intensity of a spotlight, could then be set corresponding to this measurand of twelve covered sensor points 13.

FIG. 7 shows the situation during the application of a high pressure onto the pushbutton, as illustrated in FIG. 5. The contact surface 14b covered in this situation is correspondingly enlarged due to the increased pressure applied onto the pushbutton, so that a total of 35 sensor points are here fully or partially covered. In the described example, the lighting intensity of the spotlight to be controlled can be set at a lighting intensity value which corresponds to the measurand of 35 covered sensor points 13.

The invention claimed is:

1. A method for operating a lighting control console for controlling a lighting system, wherein digital adjusting commands are generated in the lighting control console and transferred to the lighting devices of the lighting system, and wherein the lighting control console comprises at least one digital processor and at least one digital memory for generating, managing and storing the adjusting commands, and wherein the lighting control console comprises at least one display device, and wherein graphical elements can be graphically depicted on the display device to a user, and wherein the display device includes a touch-sensitive sensor surface, and wherein touching the touch-sensitive sensor surface permits selection of an operator input, said method comprising the following method steps of:
   a) detecting a contact surface formed by touching the touch-sensitive sensor surface;
   b) measuring a dimension of the contact surface formed by touching the touch-sensitive sensor surface; and
   c) generating an adjusting command controlling the lighting system as a function of the measured dimension of the contact surface, wherein a measured dimension of the contact surface having a first magnitude corresponds to an adjusting command different from an adjusting command corresponding to a measured dimension of the contact surface having a magnitude different from the first magnitude.

2. The method according to claim 1, in which a plurality of sensor points are provided in the touch-sensitive sensor surface, wherein the dimension of the contact surface is measured by determining the number of sensor points covered by a body part of an operator touching the touch-sensitive surface.

3. The method according to claim 1, in which at least one operating element is displayed at the display device, wherein the operating element is assigned an operator input.

4. The method according to claim 3, in which the operating element is displayed in the form of a pushbutton, wherein the pushbutton is assigned a specific operator input.

5. The method according to claim 1, in which touching of an operating element displayed at the display device causes selection of a functional element of the lighting system and subsequent to the measurement of the dimension of the contact surface on the operating element, a parameter of the selected functional element is set as a function of the measured dimension of the contact surface.

6. The method according to claim 1, in which lighting intensity of a lighting device is a function of the measured dimension of the contact surface.

7. The method according to claim 1, in which a zoom factor of a lighting device is a function of the measured dimension of the contact surface.

8. The method according to claim 1, in which a freeze factor of a lighting device is a function of the measured dimension of the contact surface.

9. The method according to claim 1, in which at least one of a pan-setting and a tilt-setting of a lighting device is a function of the measured dimension of the contact surface.

10. The method according to claim 1, in which a speed of motion of a drive device for adjusting a lighting device is a function of the measured dimension of the contact surface.

11. A method for operating a lighting control console for controlling a lighting system, wherein digital adjusting commands are generated in the lighting control console and transferred to the lighting devices of the lighting system, and wherein the lighting control console comprises at least one digital processor and at least one digital memory for generating, managing and storing the adjusting commands, and wherein the lighting control console comprises at least one display device, and wherein graphical elements can be graphically depicted on the display device to a user, and wherein the display device includes a touch-sensitive sensor surface, and wherein touching the touch-sensitive sensor surface permits selection of an operator input, said method comprising the following method steps of:
   a) detecting a contact surface formed by touching the touch-sensitive sensor surface;
   b) measuring a dimension of the contact surface;
   c) generating an adjusting command for controlling the lighting system as a function of the measured dimension of the contact surface, in which a parameter of the operator input assigned to said contact surface is a function of the measured dimension of the contact surface within a predefined value range, wherein the lighting control console is calibrated by recording at least the dimension of a contact surface in the form of a measurand during at least one calibration step, and said measurand is assigned a value from the value range of the parameter.

12. The method according to claim 11, in which several calibration steps are executed, wherein measurands and respectively assigned parameters resulting from the calibration steps are stored in a lookup table.

13. The method according to claim 11, in which several calibration steps are executed, wherein measurands resulting from the calibration steps are combined using an interpolated function curve, and wherein said function curve is stored.

* * * * *